United States Patent [19]
Inuzuka et al.

[11] Patent Number: 5,833,573
[45] Date of Patent: Nov. 10, 1998

[54] SPEED CHANGE CONTROL SYSTEM FOR AUTOMATIC TRANSMISSION

[75] Inventors: Takeshi Inuzuka; Masashi Hattori; Kenichi Sato, all of Anjo, Japan

[73] Assignee: Aisin AW Co., Ltd., Anjo, Japan

[21] Appl. No.: 872,109

[22] Filed: Jun. 10, 1997

[30] Foreign Application Priority Data

Jun. 11, 1996 [JP] Japan ................................ 8-170755

[51] Int. Cl.⁶ .................................................. F16H 61/06
[52] U.S. Cl. ........................ 477/143; 477/144; 477/156
[58] Field of Search .................................. 477/141, 143, 477/144, 148, 149, 156, 164

[56] References Cited

U.S. PATENT DOCUMENTS

| | | | |
|---|---|---|---|
| 4,633,739 | 1/1987 | Ogasawara et al. | 477/148 |
| 4,753,134 | 6/1988 | Hayasaki . | |
| 5,046,174 | 9/1991 | Lentz et al. | 477/148 X |
| 5,159,856 | 11/1992 | Yoshimura et al. . | |
| 5,161,432 | 11/1992 | Matsumoto et al. . | |
| 5,193,417 | 3/1993 | Niiyama et al. . | |
| 5,415,606 | 5/1995 | Kovalsky et al. | 477/156 X |
| 5,460,577 | 10/1995 | Moroto et al. . | |
| 5,505,673 | 4/1996 | Tsikamoto et al. | 477/143 X |
| 5,527,236 | 6/1996 | Kimura et al. | 477/156 X |
| 5,730,683 | 3/1998 | Usuki et al. | 477/143 |

FOREIGN PATENT DOCUMENTS 0 330 409 A2  8/1989  European Pat. Off. .

Primary Examiner—Charles A. Marmor
Assistant Examiner—Scott Lund
Attorney, Agent, or Firm—Oliff & Berridge, PLC

[57] ABSTRACT

A speed change control system for use in an automatic transmission includes a one-way clutch to be locked and to retain a rotary element in a speed change mechanism for establishing a predetermined gear stage and an engine braking frictional engagement element arrayed in parallel with the one-way clutch and adapted to retain the rotary element, thereby establishing the desired gear stage. The speed change control system further includes a throttle opening detector for detecting the stroke of depression of the accelerator pedal of a vehicle, a downshift detector for detecting a shift to a desired gear stage and an apply pressure controller for controlling the apply pressure of the engine braking frictional engagement element. A speed change decision is made to determine whether a speed change is ended for a predetermined time period, if the throttle opening is in a predetermined region and if the detected shift is a downshift to the desired gear stage. A pressure regulator holds the apply pressure of the engine braking frictional engagement element at a low level immediately before the application of engine braking pressure for a predetermined time period, and switches the apply pressure to a higher steady level, at which the application is kept, if the speed change ending decision is made. On the other hand, the pressure regulator raises the apply pressure gradually if the speed change decision is not made.

7 Claims, 10 Drawing Sheets

FIG. 2

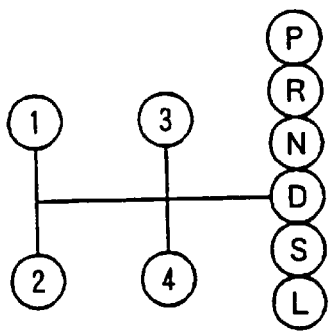

FIG. 3

| Position | | | Solenoid | | | | Clutch | | | Brake | | | | O.W.C | | |
|---|---|---|---|---|---|---|---|---|---|---|---|---|---|---|---|---|
| | | | S1 | S2 | S3 | S4 | C1 | C2 | C3 | B1 | B2 | B3 | B4 | F1 | F2 | F3 |
| P | | | × | ○ | × | | | | | | | | ○ | | | |
| R | V≤7 | | × | ○ | × | | ○ | | | | | ○ | ○ | | | |
| R | V>7 | | ○ | ○ | × | | ○ | | | | | × | ○ | | | |
| N | | | × | ○ | × | | | | | | | | ○ | | | |
| D | Auto. | 1ST | × | ○ | × | | ○ | | | | | | ○ | | ○ | ○ |
| D | Auto. | 2ND | ○ | ○ | × | | ○ | | | ○ | ○ | | ○ | ○ | | ○ |
| D | Auto. | 3RD | ○ | × | × | ◎ | ○ | ○ | | ○ | ○ | | | ○ | | |
| D | Auto. | 4TH | × | × | × | ◎ | ○ | ○ | ○ | | ○ | | | | | |
| D | Man. | 1ST | × | ○ | ○ | | ○ | | | | ○ | ○ | | | | |
| D | Man. | 2ND | ○ | ○ | × | ◎ | ○ | | | ○ | ○ | | | ○ | | ○ |
| S | | 1ST | × | ○ | × | | ○ | | | | | | ○ | | ○ | ○ |
| S | | 2ND | ○ | ○ | × | | ○ | | | ○ | ○ | | ○ | ○ | | ○ |
| S | | 3RD | ○ | × | × | ◎ | ○ | | ○ | ○ | ○ | | | ○ | | |
| S | | (3RD) | × | × | × | | ○ | | ○ | ○ | ○ | | | ○ | | |
| L | | 1ST | × | ○ | ○ | | ○ | | | | ○ | ○ | | ○ | ○ | ○ |
| L | | 2ND | ○ | ○ | × | | ○ | | | ○ | ○ | | ○ | ○ | | ○ |
| L | | (3RD) | × | × | × | | ○ | | ○ | ○ | ○ | | | ○ | | |
| Remarks | | | ○ | ON | | | Apply | | | | | | | | | |
| Remarks | | | × | OFF | | | Release | | | | | | | | | |
| Remarks | | | ◎ | ON:L-UP ON | | | | | | | | | | | | |
| Remarks | | | ◎ | OFF:L-UP OFF | | | | | | | | | | | | | at Coasting-down at Slight Depression at Kickdown

SPEED CHANGE CONTROL SYSTEM FOR AUTOMATIC TRANSMISSION

BACKGROUND OF THE INVENTION

1. Field of the Invention

The invention relates to a speed change control system for an automatic transmission and, more particularly, to a speed change control system for smoothing a speed change at a downshift.

2. Description of the Related Art

An automatic transmission is equipped with a one-way clutch as means for engaging a predetermined rotary element in its speed change mechanism so as to establish a predetermined gear stage. In the speed change mechanism having this structure, at an engine drive with a power ON, the one-way clutch is locked to engage the rotary element so that the predetermined gear stage is established. When the engine is coasting with the power OFF, on the other hand, the one-way clutch rotates idly in a disengaged state so that the gear stage is not established any more. This speed change action by the one-way clutch is effective for achieving a smooth running condition while the vehicle is frequently repeating the driving state and the coasting state on a level road, because the vehicle runs idly without any engine braking effect in the coasting state.

In the coasting state during an ordinary deceleration or a downhill run, the engine braking effect is desired. To achieve engine braking, an engine braking frictional engagement element is arrayed in parallel with the one-way clutch. When it is necessary in the automatic transmission to apply the engine braking frictional engagement element during a manual downshift, the control is made separately at the power ON time and at the power OFF time in accordance with the throttle opening. This technique is disclosed in the prior arts by U.S. Pat. Nos. 5,193,417 and 5,159,856. According to these disclosures, at the power ON time, the one-way clutch is locked so that a smooth speed change can be made. Because it is not necessary to effect an engine braking quickly, the control applies the engine braking frictional engagement element after the speed change is finished. At the power OFF time, the line pressure is temporarily raised for meeting the idle rotation of the one-way clutch and for the quick speed change response, as expected by the driver, thereby allowing the application of the engine braking frictional engagement element quickly.

Depending upon the throttle opening, there exists a region which is neither clearly the drive state nor the coasting state, or a region in which the drive state and the coasting state are difficult to discriminate. This state will be referred to throughout this specification as the "slight depression state" (which usually corresponds to the region having 1% to 15% of throttle opening), as defined by the stroke of depression of the accelerator pedal. In the prior art described above, both of the aforementioned controls are made, even during the slight depression state, so that the following problems occur. In the case of the power ON control, the one-way clutch may idly rotate, and this idle run will continue indefinitely so long as the speed change is ended. In the power OFF control, in addition, the speed change is made by the application of the engine braking frictional engagement element. However, the transmission torque is at 0 or an extremely small value so that a shock is caused at the initial state of application by the temporary rise in the line pressure. In this state, a speed change may possibly be made by the lock of the one-way clutch. This control may obstruct the smooth speed change by the one-way clutch.

SUMMARY OF THE INVENTION

It is, therefore, a first object of the invention to provide a speed change control system for an automatic transmission that is enabled to make a quick and proper speed change having little shock by controlling the application of an engine braking frictional engagement element, as arrayed in parallel with a one-way clutch, at a downshift time in accordance with the action of the one-way clutch.

A second object of the invention is to improve the speed change response during a manual shift by realizing the aforementioned speed change in a manual shift mode.

A third object of the invention is to establish a smooth speed change having no shock in a throttle opening region where smooth control is difficult, by making the control in accordance with the throttle opening.

A fourth object of the invention is to establish a smooth speed change having no shock especially in the slight depression state.

A fifth object of the invention is to establish the speed change by controlling the oil pressure of the engine braking frictional engagement element.

In order to achieve the above-specified objects, according to the invention, there is provided, in a speed change control system for an automatic transmission comprising: a one-way clutch to be locked in drive state and to selectively retain a rotary element in a stationary position relative to the transmission casing for establishing a predetermined gear stage; an engine braking frictional engagement element arranged in parallel with the one-way clutch for selectively retaining the rotary element in a stationary position relative to the transmission casing to establish the gear stage, throttle opening detecting means for detecting the stroke of depression of the accelerator pedal of a vehicle; downshift detecting means for detecting a shift to the predetermined gear stage; and apply pressure control means for controlling the apply pressure of the engine braking frictional engagement element, wherein the apply pressure control means includes: speed change deciding means for deciding whether or not a speed change is ended for a predetermined time period, if the throttle opening detected by the throttle opening detecting means is in a predetermined region, and if the shift to be detected by the downshift detecting means is a downshift to the predetermined gear stage; and pressure regulator means for holding the apply pressure of the engine braking frictional engagement element at a low level immediately before fully applying said engine braking friction engagement element after the predetermined time period, and for immediately switching the apply pressure to a steady level, at which the apply pressure is kept, if the speed change ending decision is made, and raising the apply pressure gradually from the low level if the speed change ending decision is not made.

Next, in order to achieve the second object, the speed change control system comprises a manual shift mode for making it possible to select an arbitrary gear stage manually, and the downshift detecting means has shift position detecting means for detecting a shift position in the manual shift mode.

In order to achieve the third object, the predetermined region of throttle opening is divided into regions for a kickdown control, a slight depression control and a coasting-down control. The pressure regulator means: applies the engine braking frictional engagement element by feeding the steady pressure at which the application is kept, if the throttle opening detected by the throttle opening detecting means is in the kickdown control region and if a predetermined gear stage is established by the lock of the one-way clutch so that the speed change ending decision is made by the speed change deciding means; holds the apply pressure of the engine braking frictional engagement element at a low level for a predetermined time period, if the throttle opening is in the slight depression control region, switches the apply pressure to a steady level, if the speed change ending decision by the speed change deciding means is made for the predetermined time period, and raises the apply pressure gradually if the speed change ending decision is not made; and boosts the apply pressure, then returns it to a low level and raises it gradually if the throttle opening is in the coasting-down control region.

In order to achieve the fourth object, the predetermined region of throttle opening is in the vicinity of a boundary between a drive state and a coasting state.

In order to achieve the fifth object, the pressure regulator means includes: a change-over valve for switching the feed/release of the oil pressure of the engine braking frictional engagement element; a solenoid valve for actuating the change-over valve; and a throttle linear solenoid valve and a low modulator valve for regulating the oil pressure to the apply pressure by outputting signal pressures according to the throttle opening.

BRIEF DESCRIPTION OF THE DRAWINGS

The invention will be described with reference to the drawings in which:

FIG. 2 is a diagram showing a shift pattern of the automatic transmission;

FIG. 3 is an operation diagram of the automatic transmission;

DETAILED DESCRIPTION OF PREFERRED EMBODIMENTS

Figure 1:
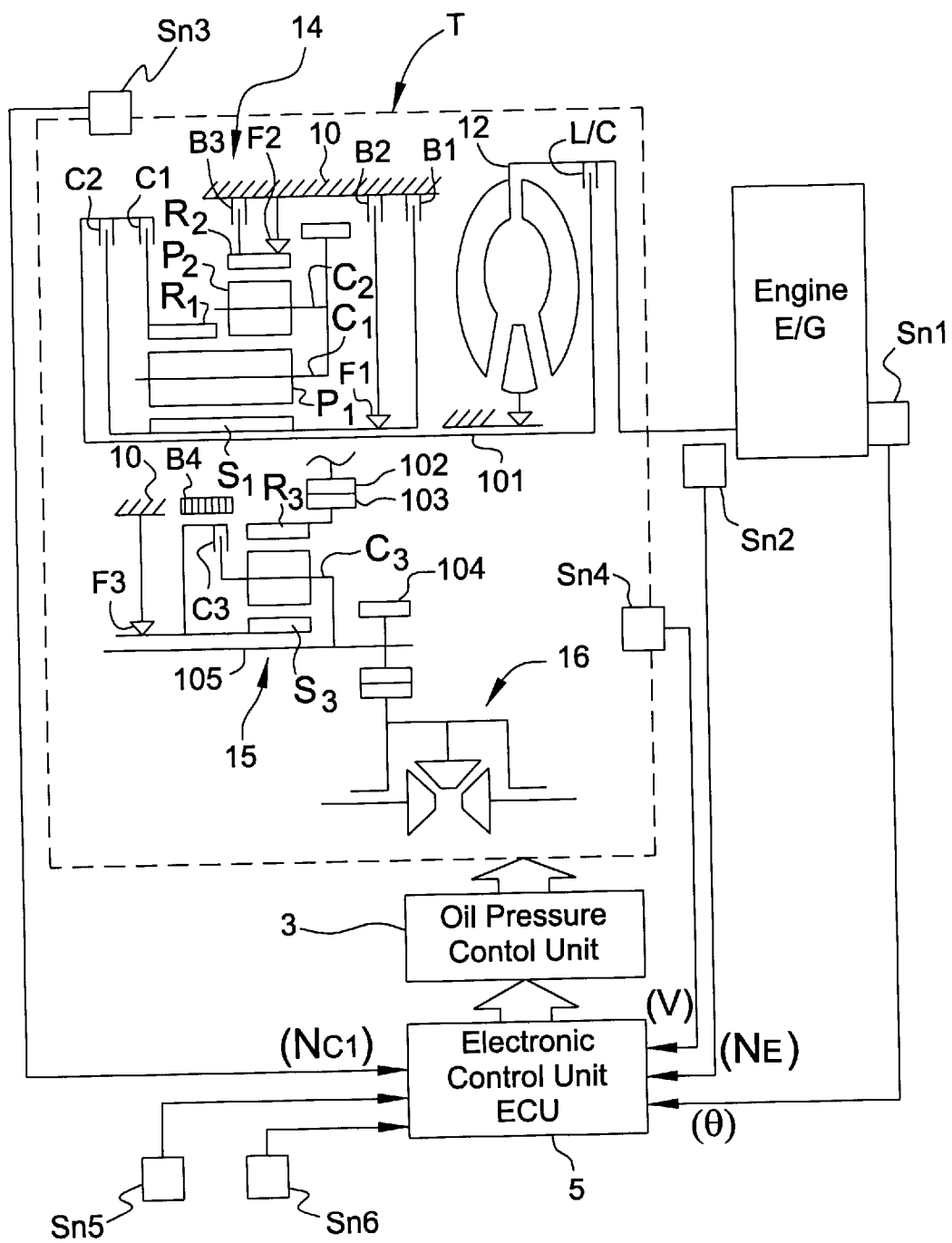
FIG. 1 is a system structure diagram showing a speed change mechanism of an automatic transmission according to one embodiment of the invention.

The invention will be described in connection with an embodiment with reference to the accompanying drawings. First of all, FIG. 1 is a system structure diagram of an automatic transmission T, and shows a speed change mechanism in a schematic diagram and control units in a block diagram. Automatic transmission T includes a gear train having four forward and one reverse speeds for a front-engine front-drive car. The automatic transmission T includes: a torque converter 12 with a lockup clutch (L/C); a gear train of two-axis structure having a main speed change unit 14 as a speed change mechanism and a planetary gear unit 15 of underdrive structure; a differential unit 16; an oil pressure control unit 3 for controlling the gear train and the lockup clutch (L/C); and an electronic control unit (ECU) 5 for controlling the hydraulic control unit 3.

In FIG. 1: Sn1 designates a throttle opening sensor for detecting the throttle opening (θ) of the engine (E/G); Sn2 is an engine rotation sensor for detecting the RPM (NE) of the engine (E/G); Sn3 is an input rotation sensor for detecting the input RPM from the RPM ($N_{C1}$) of the automatic transmission T; Sn4 is a vehicle speed sensor for detecting the vehicle speed (V) from the output RPM of the same; Sn5 is a neutral start switch for detecting the range position of a manual shift; and Sn6 is a shift position sensor for detecting the shift position of the manual shift. The electronic control unit 5 comprises a control computer for sending control signals to the individual solenoid valves and linear solenoid valves of the oil pressure control unit 3, as built in the automatic transmission T. The control signals are based on the data from the above-mentioned individual sensors, mainly in response to the vehicle speed (V) and the throttle opening (θ), and in accordance with the packaged programs, so that the gear train and the lockup clutch (L/C) may be controlled by the oil pressure control unit 3.

The main speed change unit 14 of the automatic transmission T includes a planetary gear unit of single pinion structure and a planetary gear unit of double pinion structure. These two planetary gear units are given a combined structure by integrating a common sun gear $S_1$, a pinion gear $P_1$ that extends from the single pinion side to the double pinion side, and by connecting a carrier $C_1$ supporting the pinion gear $P_1$ and a carrier $C_2$ supporting the other pinion gear $P_2$ at the double pinion side. The sun gear $S_1$, as shared between the two gear units of the main speed change unit 14, can be selectively locked to a transmission casing 10 through a brake B1 and through a one-way clutch F1 and a brake B2, as arrayed in series. A ring gear $R_1$ at the single pinion side is connected through a clutch C1 and the sun gear $S_1$ is connected through a clutch C2 to an input shaft 101 that is connected to the turbine output shaft of the torque converter 12. The carrier $C_1$ supporting the pinion gear $P_1$, and the carrier $C_2$ connected to the carrier $C_1$ and supporting the pinion gear $P_2$ are connected to a counter gear 102. The ring gear $R_2$ at the double pinion side of main speed change unit 14 can be selectively locked to the transmission casing 10 by a brake B3 and a one-way clutch F2, as arrayed in parallel. In automatic transmission T: the ring gear $R_2$ is referred to as the rotary element; the one-way clutch is the one-way clutch F2; and the engine braking frictional engagement element is the brake B3.

A ring gear $R_3$ of the underdrive planetary gear unit 15 is an input element connected to the main shift unit 14 through counter gears 102 and 103; a carrier $C_3$ and a sun gear $S_3$ are connected through the clutch C3; the sun gear $S_3$ can be fixed on the transmission casing 10 through a one-way clutch F3 and a band brake B4, as arrayed in parallel; and the carrier $C_3$ is connected to an output gear 104 to the differential unit 16.

In the gear train thus constructed, the input, as transmitted to the ring gear $R_1$ through the clutch C1 of the main speed change unit 14, is outputted as the rotations of the carriers $C_1$ and $C_2$ by the reaction support of the ring gear $R_2$ with the one-way clutch F2 being locked, so that a first speed is established under the underdrive rotation in which the clutch C3 of the underdrive planetary gear unit 15 is released, the brake B4 is applied, and in which the sun gear $S_3$ is retained relative to transmission casing 10 so that the ring gear $R_3$ acts as the input whereas the carrier $C_3$ acts as the output.

During reverse drive when the carrier $C_3$ acts as the input, on the contrary, the reaction to be applied to the ring gear $R_2$ is inverted to set the one-way clutch F2 free so that the first speed is not achieved. In order that the first speed may also be established during the reverse drive to effect the engine braking, therefore, the brake B3 is applied in this gear train.

In the aforementioned state, in addition, the brake B2 is applied to retain the sun gear $S_1$ so that the input of the ring gear $R_1$ is outputted as the rotations of the carriers $C_1$ and $C_2$ to establish a second speed. A third speed is established in the directly connected state of the underdrive planetary gear unit 15, in which the brake B4 is released whereas the clutch C3 is applied. In the directly connected state of the main speed change unit 14, in which the ring gear $R_1$ and the sun gear $S_1$ are synchronously rotated by applying the clutch C2 additionally, the input rotation is outputted as it is from the carriers $C_1$ and $C_2$ to establish a fourth speed. By applying the clutch C2 and the brake B3, the input is made to the sun gear $S_1$, and the ring gear $R_2$ is retained relative to transmission casing 10 so that the carrier $C_2$ is reversed to establish a reverse stage.

FIG. 2 is a shift pattern of a shift unit for operating the automatic transmission described above. In this unit, the shift pattern is constructed by combining the I-pattern, in which the parking (P), reverse (R), neutral (N), drive (D), second (S) and low (L) range positions for the automatic shift are arranged in the shape of letter "I", and the H-pattern in which the first to fourth shift positions for the manual shift are arranged in the shape of letter "H". Each position on the I-pattern is detected as in the ordinary automatic shift of the prior art by the neutral start switch, and each of the first to fourth positions is detected by another manual shift position sensor.

FIG. 3 tabulates the relations between the actions of the aforementioned clutches, brakes, one-way clutches (O.W.C) and solenoids, and the individual gear stages, i.e., the first (1ST) to fourth (4TH) speeds to be achieved by the actions. In FIG. 3, symbols O indicate the applied states (or ON for the solenoids), and symbols X or blanks indicate the released states (or OFF for the solenoids).

Figure 4:
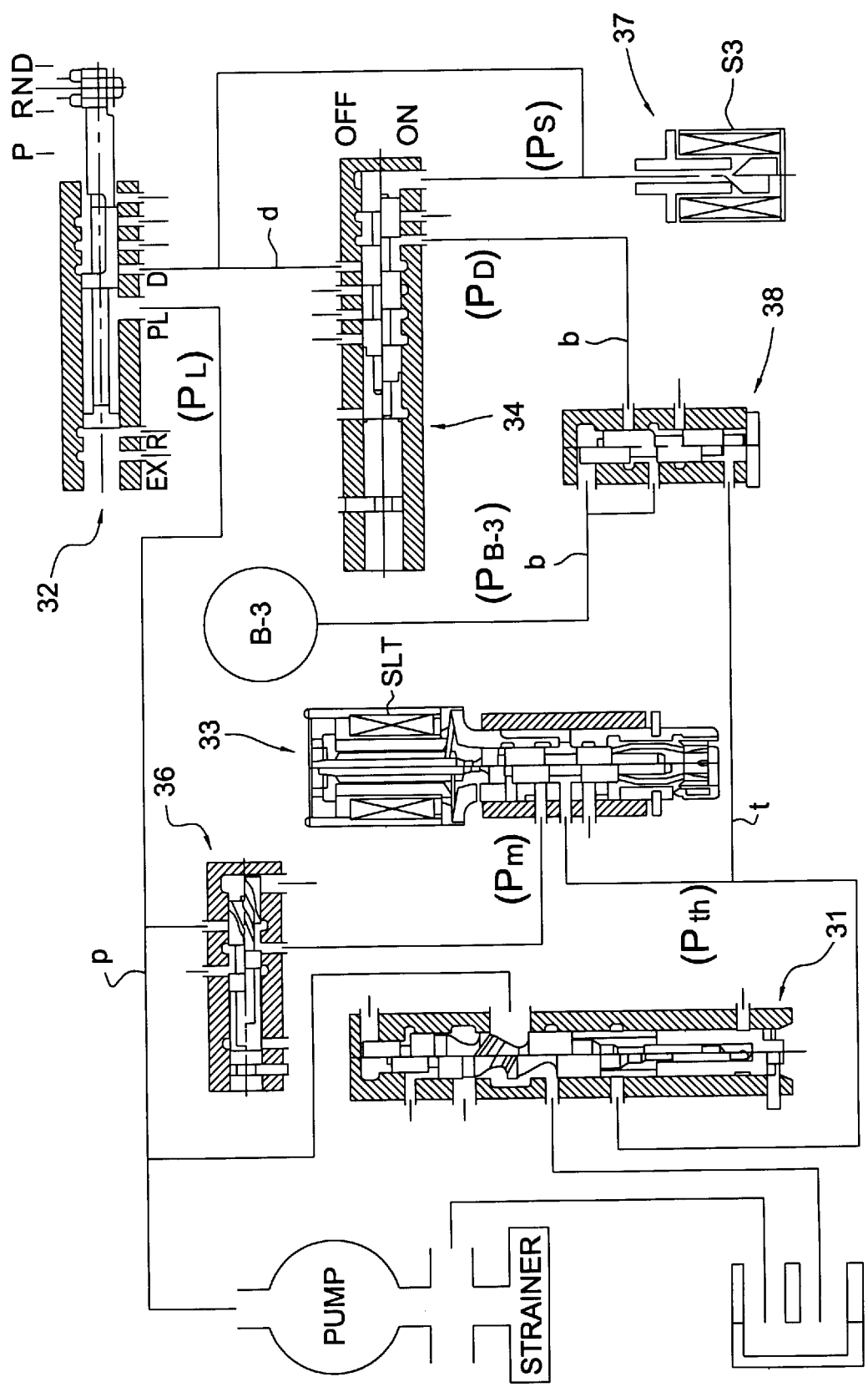
FIG. 4 is a hydraulic circuit diagram of the automatic transmission.

A hydraulic circuit to act as the oil pressure control unit for controlling the gear train thus constructed employs such an oil pump (PUMP) for its oil pressure source as is driven by the turbine output shaft of the torque converter, as shown in FIG. 4. The hydraulic circuit is equipped with: a primary regulator valve 31 for regulating its discharge pressure to a line pressure ($P_L$) according to the running load, i.e., the vehicle speed (V) and the throttle opening (θ) at every instant of use of the vehicle and for outputting a secondary pressure; a regulator valve such as a secondary regulator valve (although not shown) for lowering and regulating the secondary pressure to a torque converter feed pressure and for outputting the residual pressure as a lubrication pressure; a manual valve 32 for switching and feeding the individual range pressure oil passages with the line pressure ($P_L$); change-over valves such as the individual shift valves; a variety of linear solenoid valves for controlling the regulator valves with signal pressures; a solenoid valve for controlling the individual change-over valves; and check valves and orifices fitted in the oil passages for connecting those circuit components.

FIG. 4 shows only such a portion of the hydraulic circuit as relates to the speed change control of the invention. This circuit includes a throttle linear solenoid valve 33, a solenoid modulator valve 36, a B-3 control valve 34, a solenoid valve 37 and a low modulator valve 38, as arranged in relation to the primary regulator valve 31 and the manual valve 32.

The primary regulator valve 31 is connected with a line pressure oil passage p and is fed with a throttle pressure (Pth) according to the throttle opening (θ) and a governor pressure characteristic of the particular vehicle so that it regulates the pump discharge pressure to the line pressure ($P_L$) in accordance with a vehicular running load at every running instant.

The manual valve 32 performs a switching action to connect the line pressure oil passage p to the individual range pressure oil passages (of which only a D-range pressure oil passage d is shown, with while others being shown only at their port portions) in response to the range position selection at the time of the automatic shift. At the manual shift time, in addition, the manual valve 32 is fixed at the D-range position independently of the shift position.

The throttle linear solenoid valve 33 is connected through the solenoid modulator valve 36 with the line pressure oil passage p so that it regulates the solenoid modulator pressure (Pm) as a basic pressure on the basis of the signal from the electronic control unit 5 and outputs the throttle pressure (Pth). This throttle pressure (Pth) is applied via a throttle pressure oil passage to the primary regulator valve 31 and the low modulator valve 38. The solenoid modulator valve 36 is provided for lowering the line pressure ($P_L$) to the solenoid modulator pressure (Pm), which is suited for pressure regulation by the throttle linear solenoid valve 31.

The B-3 control valve 34 is provided for switching and connecting, when actuated, the servo oil passage b of a hydraulic servo (B-3) with the D-range pressure oil passage d and the drain oil passage and is actuated by applying/releasing a solenoid pressure ($P_s$). The solenoid valve 37 is given a normally open type ON/OFF valve for closing the drain when the solenoid signal from the electronic control unit 5 is ON.

The low modulator valve 38 is a feedback control pressure-reducing valve, as disposed in the servo oil passage b leading to the hydraulic servo (B-3) of the brake B3 so that it reduces the D-range pressure ($P_D$) to an apply pressure ($P_{B-3}$) in accordance with the throttle pressure (Pth) and feeds the apply pressure to the hydraulic servo (B-3).

Figure 5:
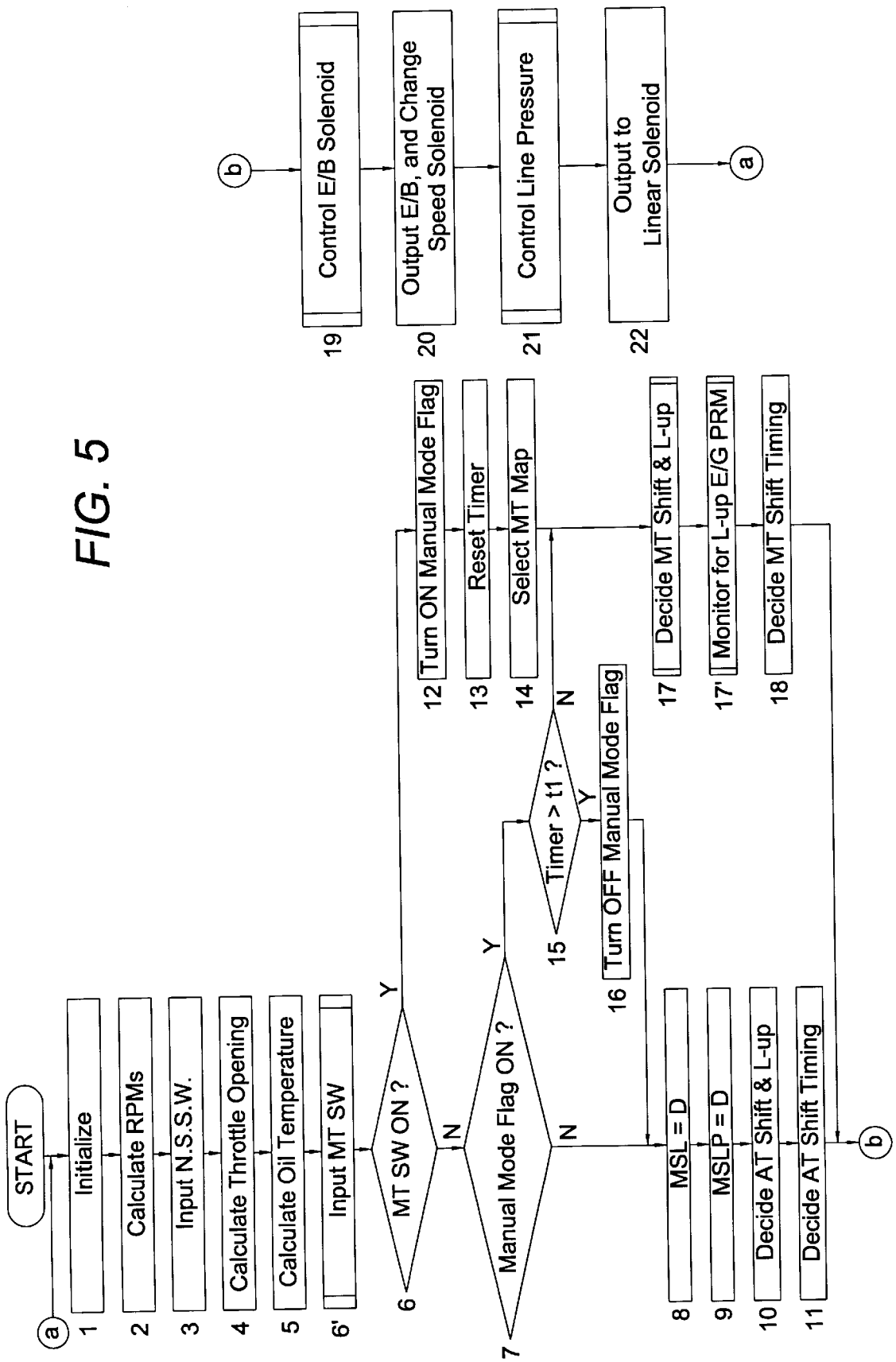
FIG. 5 is a general flow chart showing a main routine of the speed change control system of the automatic transmission.

The hydraulic circuit of FIG. 4 thus constructed is controlled by the speed change control means or the program stored in the electronic control unit 5. As shown in the flow chart of FIG. 5, at the start of the program, all the conditions are initialized at Step 1. At Step 2, the present RPMs of the input shaft and the output shaft of the transmission are calculated from the signals coming from the transmission input rotation sensor (Sn3) and the vehicle speed sensor (Sn4). At Step 3, the range position, as selected on the I-pattern of the automatic shift, is detected from the signal of the neutral start switch (N.S.S.W). Simultaneously with this, the failure of the neutral start switch is decided. At Step 4, the present throttle opening is calculated from the signal of the throttle opening sensor (Sn1). At Step 5, the present oil temperature of the transmission (that is, the ATF temperature) is calculated from the signal of the (not-shown) transmission oil temperature sensor.

Thus, the various conditions necessary for the control are calculated, and the shift position is selected at Step 6' from the signal of the manual shift position sensor (Sn6). Since this process is not executed in the automatic shift mode, the answer to next Step 6—of what manual shift position sensors (SW1 to SW4) are ON, is NO (N); and the answer to Step 7—of whether the manual shift mode (MT SW) is ON (or in the manual shift mode selected state), is NO (N). At Step 8, therefore, the data (D) for the automatic shift are read in the shift diagram data (MSL). At Step 9, the data (D) for the automatic shift lockup are read in the lockup diagram data (MSLP). At Step 10, the automatic (AT) shift and the lockup are decided on the basis of the data, as read at Steps 8 and 9, and the calculated various conditions. At Step 11, the timings of the automatic shift and lockup, as decided at Step 10, are decided.

If the signal of the manual shift position sensor (Sn6) is inputted at Step 6', on the other hand, the answer of Step 6 is YES (Y), and the routine advances to Step 12, at which the manual shift mode flag is turned ON to establish the manual shift mode selected state. At Step 13, the value of the automatic shift mode restoring timer is reset. At Step 14, the routine enters a subroutine for reading the various data for the manual shift mode. At Step 17, the subroutine is executed for deciding the manual shift and the lockup on the basis of the data, as read in the manual shift map selecting subroutine, and the calculated various conditions. At Step 17', a subroutine is executed for deciding the lockup by monitoring the change in the engine RPM (or deceleration) in the manual shift mode. At next Step 18, the timings of the manual shift and the lockup, as decided at Steps 17 and 17', are decided.

At Step 19 subsequent to either of the preceding flows, a subroutine is executed for controlling and deciding the engine brake solenoid (S3) from the manual shift position and the throttle opening. At Step 20, the signals are outputted to the individual solenoids (S1 to S3) (as shown in FIG. 3) to start the speed change in accordance with the decisions of Steps 10 and 11 or Steps 17, 18 and 19. At Step 21, a subroutine is executed for controlling the line pressure during the speed change in accordance with a demanded speed change and the manual shift position. At last Step 22, the signals are outputted to a throttle linear solenoid (SLT) and the lockup solenoid (SLU) to control the hydraulic circuit by the decision and control of Steps 10 and 11 or Steps 17, 18 and 21.

The operations of intermediate Steps 15 and 16 are those of the timer for restoring the automatic shift mode when the manual shift is released. At this time, the answer of Step 6 is NO (N), and the answer of Step 7 is YES (Y). At Step 15, therefore, the value of the automatic shift mode restoring timer and a set value (t1) are compared. After a predetermined time period has elapsed, if the condition of Step 15 is satisfied, the manual shift mode flag is turned OFF at Step 16 to restore the automatic shift mode.

Figure 6:
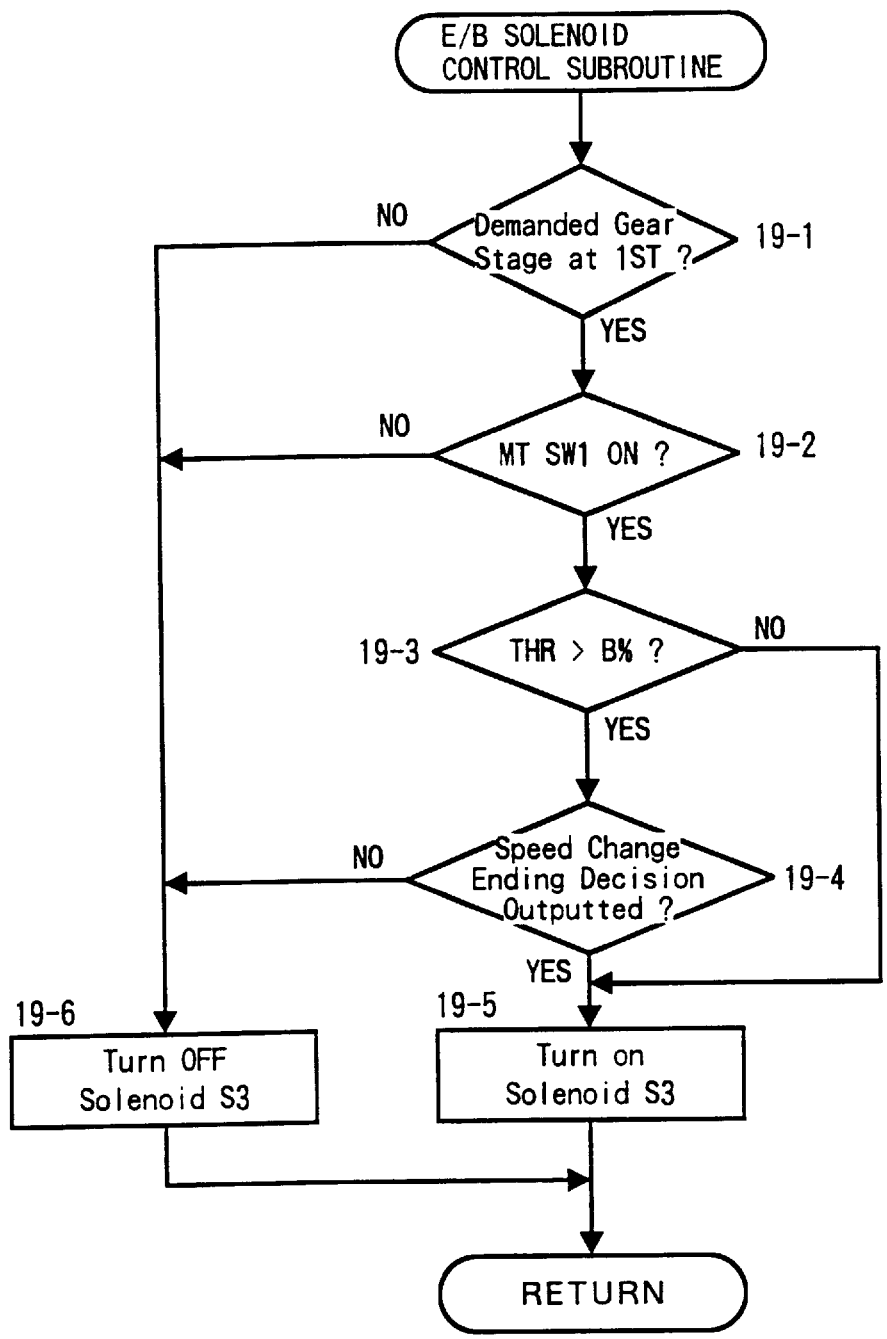
FIG. 6 is a flow chart showing an engine brake solenoid control subroutine of the speed change control system.

The engine brake (E/B) solenoid control subroutine of Step 19 is shown in FIG. 6. At Step 19-1, it is decided whether the gear stage, as demanded by the speed change decisions of Steps 10 and 17, is at the first speed. At Step 19-2, it is decided whether the switch (SW1) of the shift position sensor, corresponding to the 1st speed of the shift position, is ON. At Step 19-3, it is decided from the result of Step 4 whether the throttle opening in the speed change decision is over B %. If this answer is YES, it is decided at Step 19-4 whether the speed change ending decision has been outputted. If this answer is YES, it is decided at Step 19-5 that the engine brake solenoid (S3) is ON. If the answer of Step 19-1, 19-2 or 19-4 is NO, it is decided at Step 19-6 that the engine brake solenoid (S3) is OFF.

Figure 7:
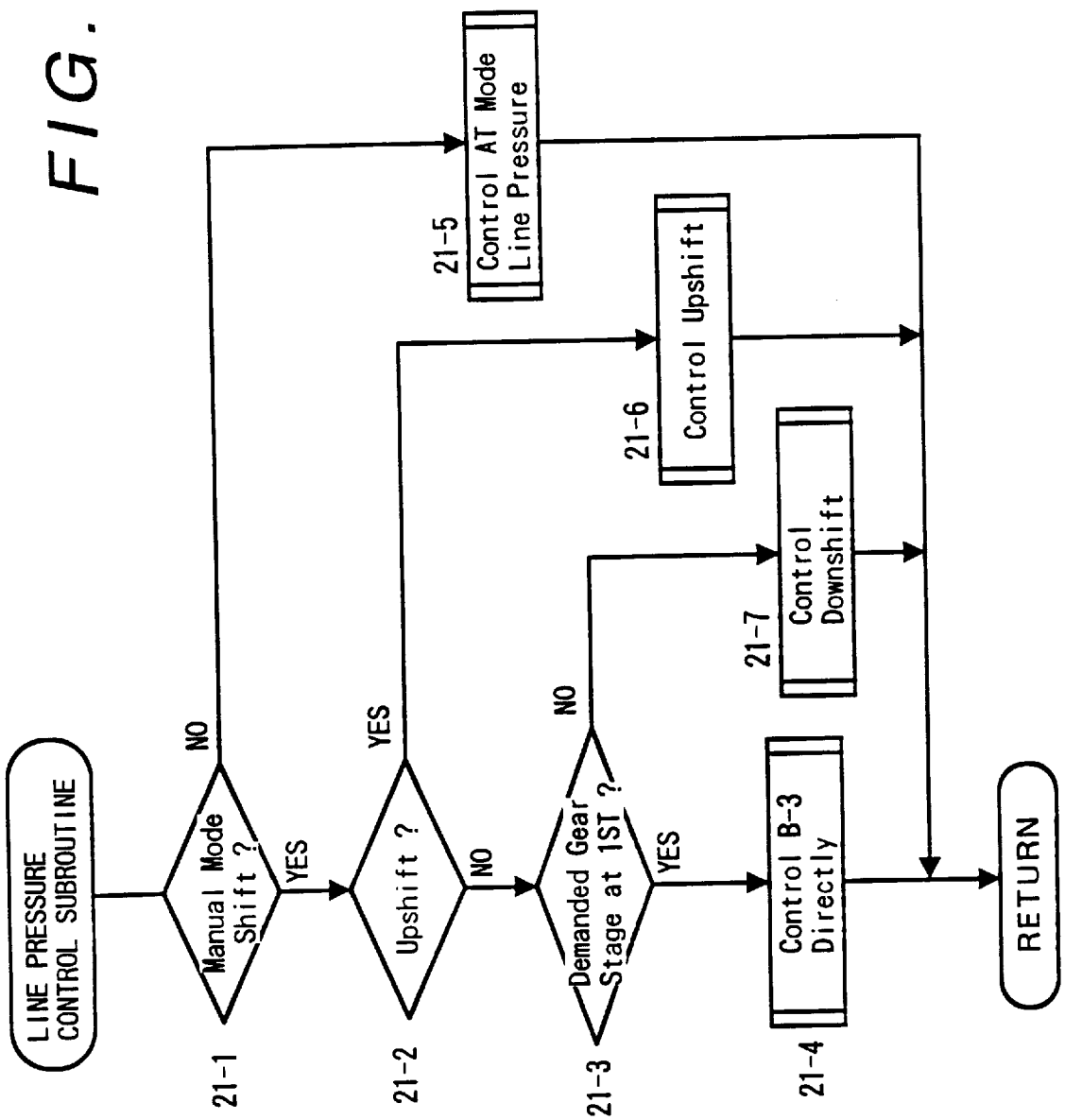
FIG. 7 is a flow chart showing a line pressure control subroutine of the speed change control system.

Next, the line pressure control subroutine of Step 21 is shown in FIG. 7. At Step 21-1, it is decided from the speed change decisions of Steps 10 and 17 whether the demanded speed change is the automatic shift or the manual shift. If the manual shift mode is decided, it is decided at Step 21-2 from the speed change decisions of Steps 10 and 17 whether the demanded speed change is an up shift. If Step 21-2 decides a downshift, it is decided at Step 21-3 from the speed change decisions of Steps 10 and 17 whether the demanded gear stage is at the first speed. If this answer is YES, the apply pressure of the hydraulic servo (B-3) is directly controlled at Step 21-4 by the throttle linear solenoid valve in accordance with the throttle opening. If the answer of Step 21-1 is NO (N), on the other hand, the line pressure in the automatic shift mode is controlled at Step 21-5. If both the answers of Steps 21-1 and 21-2 are YES, there is executed at Step 21-6 an up shift line pressure control subroutine in which the line pressure during the speed change is estimated from the turbine torque and is set. If the answer of Step 21-3 is NO so that the gear stage is other than the first speed, there is executed at Step 21-7 a downshift line pressure control subroutine in which a quick response is stressed.

Figure 8:
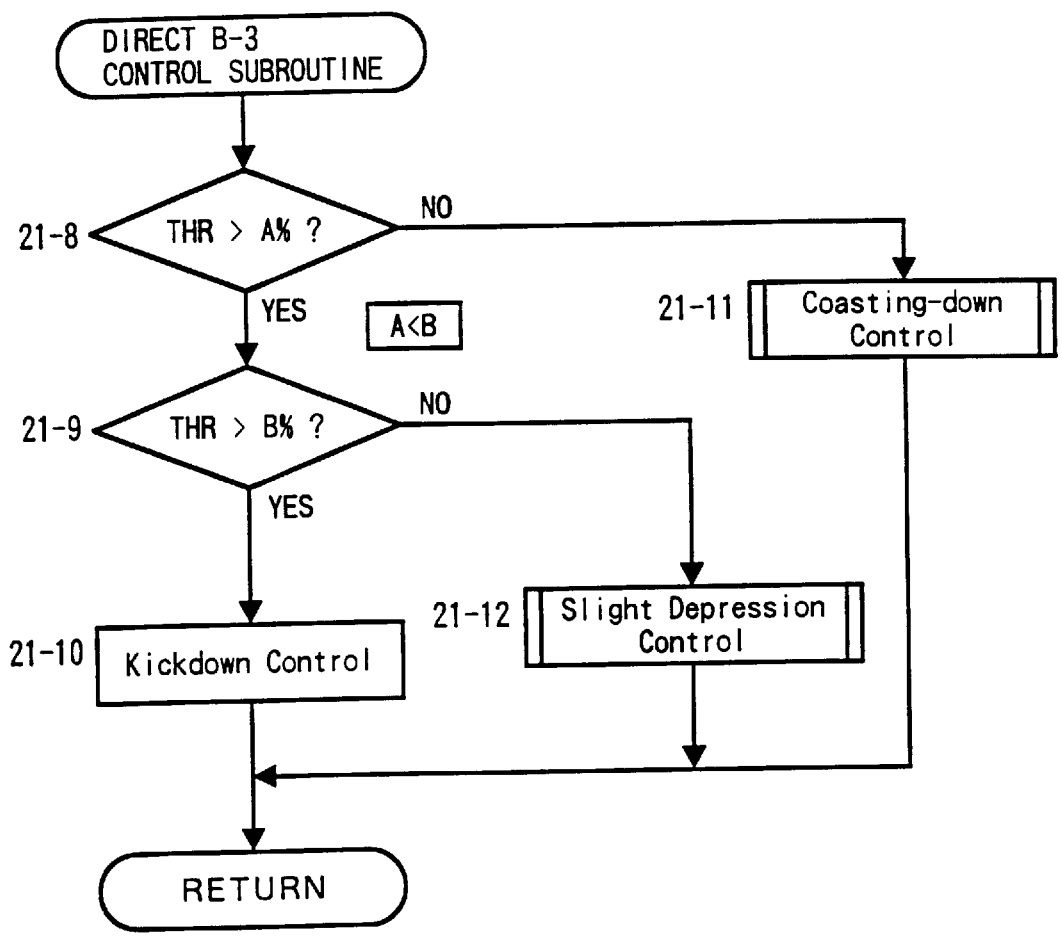
FIG. 8 is a flow chart showing a direct control subroutine for the engine braking of the speed change control system.

The B-3 direct control subroutine of Step 21-4 is shown in FIG. 8. In this routine, it is decided at Step 21-8 from the result of Step 4 whether the throttle opening at the speed change deciding time is over A %. At Step 21-9, it is decided from the result of Step 4 whether the throttle opening at the speed change deciding time is over B %. If both of these answers are YES, the one-way clutch F2 is applied without fail, and a kickdown control is executed at Step 21-10. If the answer of Step 21-8 is NO, on the other hand, the one-way clutch F2 is not applied, and a coasting-down control subroutine is entered at Step 21-11 to execute the coasting-down control. If the answer of Step 21-9 is NO, it is impossible to predict whether or not the one-way clutch F2 is to be applied. At Step 21-12, therefore, a slight depression control subroutine is entered to execute the slight depression control.

Figure 9:
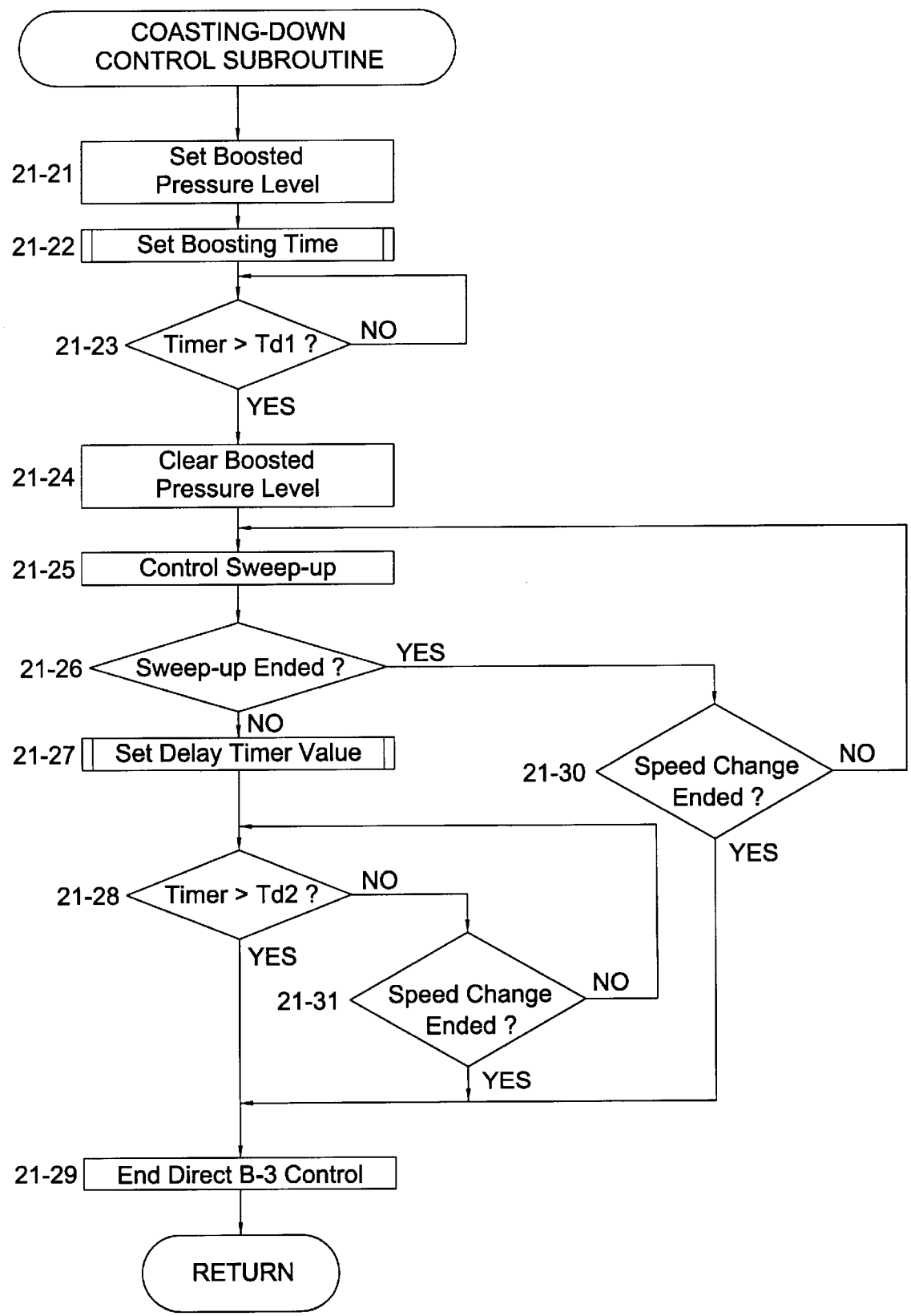
FIG. 9 is a flow chart showing a coasting-down control subroutine of the speed change control system.

FIG. 9 shows a specific content of the coasting-down control subroutine 21-11. In this routine, at Step 21-21, a boosted pressure level in a boosting control is set for shortening the time lag due to the piston stroke. At next Step 21-22, there is executed a subroutine for setting a boosting time (Td1) in accordance with the shift and the vehicle speed. At Step 21-23, the boosting time, as set at Step 21-22, and the timer are compared. If the boosting time is exceeded at Step 21-23, the boosted pressure value is cleared at Step 21-24. At Step 21-25, the B-3 apply pressure is swept up on the basis of the sweep data according to the shift and the vehicle speed. At Step 21-26, it is decided whether the sweep data are equal to a sweep end pressure. If this answer is NO, there is executed at Step 21-27 a subroutine for setting a delay timer value (Td2) in accordance with the shift and the vehicle speed. At Step 21-28, the value, as set at Step 21-27, and the timer are compared. If the time elapsed exceeds the delay timer value, the direct B-3 control is ended at final Step 21-29, and the feed of the throttle pressure according to the throttle opening is restored. In this routine, the B-3 direct control is ended as soon as the speed change ending decision is made midway by deciding whether the speed change ending decision of Step 21-30 or 21-31 is outputted.

Figure 10:
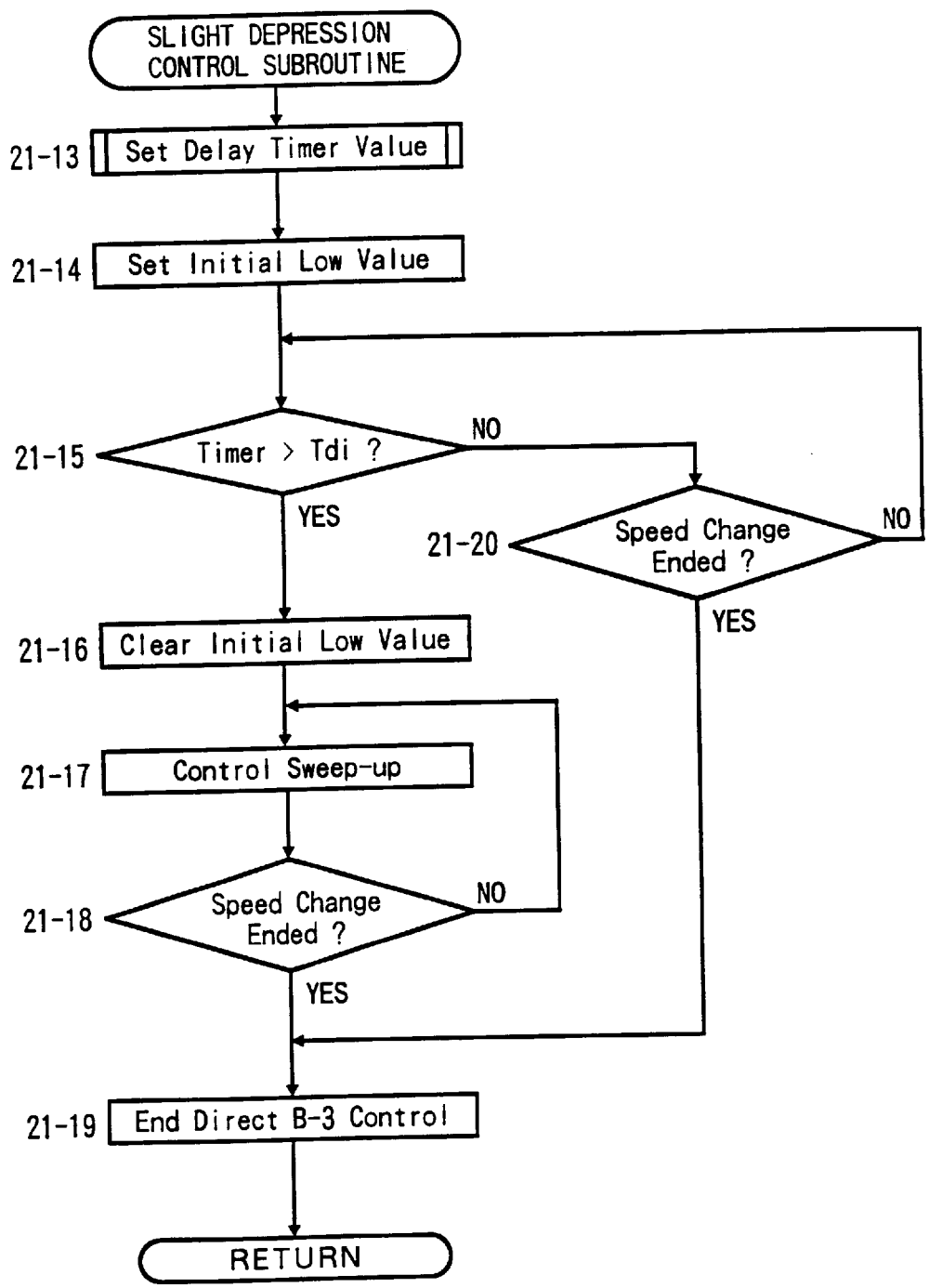
FIG. 10 is a flow chart showing a slight depression control subroutine of the speed change control system.

FIG. 10 shows a specific content of the slight depression control subroutine 21-12. In this routine, at Step 21-13, there is executed a subroutine for setting the delay timer value in accordance with the shift and the vehicle speed. At next Step 21-14, an initial low pressure value is set. At Step 21-15, an initial low pressure state holding delay timer value and a set value (Tdi) are compared. If the initial low pressure state holding delay timer value exceeds the set value, the initial low pressure value is reset at Step 21-16. At Step 21-17, the sweep-up data are set according to the shift and the vehicle speed, and the sweep-up at the B-3 apply pressure is executed. At next Step 21-18, it is decided whether the speed change ending decision has been outputted. If this answer is YES or if it is decided that the speed change ending decision of Step 21-20 is outputted, the B-3 direct control is instantly ended at Step 21-19, and the throttle pressure according to the throttle opening is applied to the hydraulic servo (B-3).

Figure 11A:
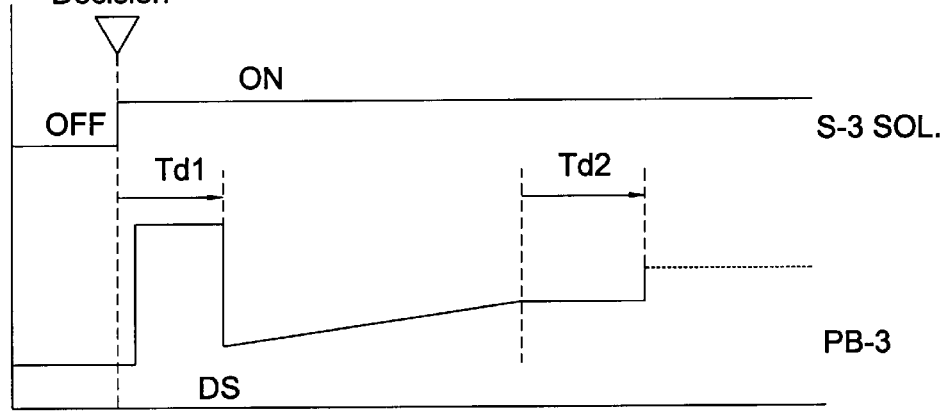
FIGS. 11(A)–11(C) are time charts illustrating the coasting-down control, the slight depression control and the kickdown control of the speed change control system in comparison.
Figure 11B:
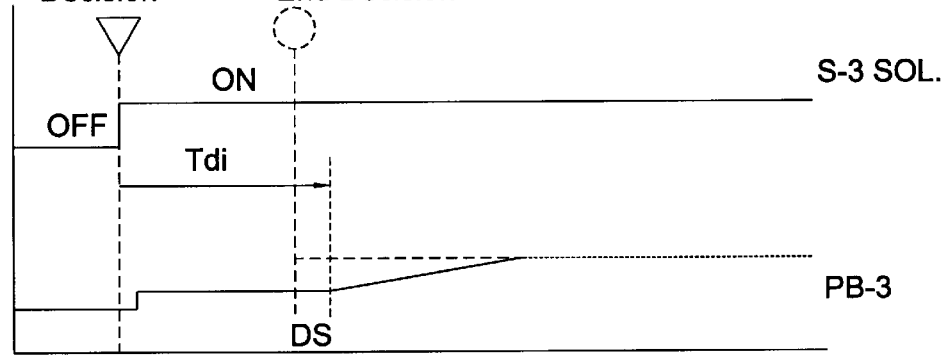
Figure 11C:
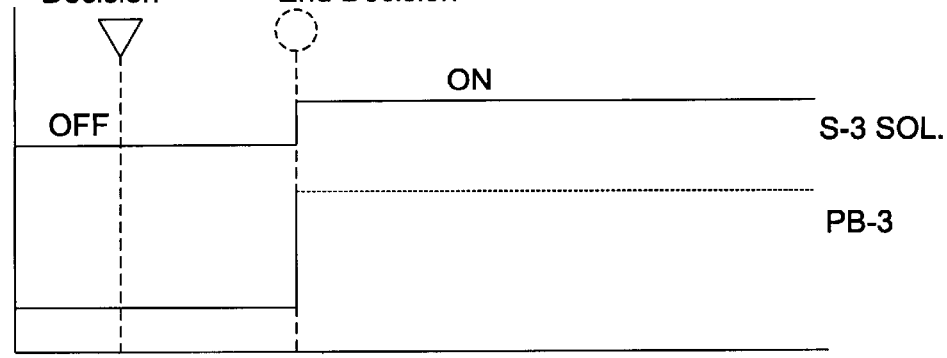

FIGS. 11 (A) to (C) illustrates the differences among the operations of the coasting-down control, the slight depression control and the kickdown control described above, by comparing their processing contents in time charts. In the coasting-down control, as illustrated at FIG. 11 (A), if a speed change decision is made, the engine brake solenoid S3 is turned ON. As a result, the solenoid valve 37 shuts the drainage of the signal pressure oil passage, and the B-3 control valve 34 is switched by the application of the signal pressure so that the feed of the oil pressure to the servo oil passage b connected with the hydraulic servo (B-3) of the brake B3 is started for a quick piston stroke by the low modulator valve 38. For this start, a duty signal for a high pressure is outputted from the electronic control unit 5 to the throttle linear solenoid valve 33. This oil pressure feed is continued until a piston stroke end (DS) while being metered with the timer value (Td1). After passage of the timer value (Td1), the brake pressure ($P_{B-3}$) is lowered to an application standby pressure. After this, the apply pressure ($P_{B-3}$) is gradually raised till an inertia phase starts. When the inertia phase starts, a constant pressure for achieving the application is kept till the timer value (Td2) is passed. At last, after the end of the timer value (Td2), the control is ended, and the throttle pressure according to the throttle opening is fed to the hydraulic servo (B-3) of the brake B3.

In the slight depression control, as illustrated at FIG. 11 (B), if a speed change decision is made, the engine brake solenoid (S3) is turned ON to switch the B-3 control valve 34 so that the feed of the oil pressure to the hydraulic servo (B-3) of the brake B3 is started, as in the aforementioned coasting-down control. In this slight depression control, however, a duty signal for the low pressure is outputted from the electronic control unit 5 to the throttle linear solenoid valve 33, and the low pressure value is fed to the hydraulic servo (B-3) of the brake B3 till the end of the piston stroke so that the control awaits the passage of the timer value (Tdi). If the one-way clutch F2 is locked for this period, the speed change ending decision is made, as indicated by a dotted line. At this instant, the output from the electronic control unit 5 is raised to switch the pressure to a steady level, as indicated by a dotted line. If the timer value (Tdi) is passed without any lock of the one-way clutch F2, on the other hand, the brake pressure ($P_{B-3}$) is gradually raised to a set level. When the speed change is made by the brake B3, the brake pressure is kept at the steady level.

In the kickdown control, as illustrated at FIG. 11 (C), if a speed change decision is made, the first speed is established by the automatic lock of the one-way clutch F2 so that the solenoid (S3) is left OFF while awaiting the speed change end. Therefore, the brake apply pressure ($P_{B-3}$) indicates O. When the speed change ending decision is made before long, the solenoid (S3) is turned ON. As a result, the solenoid valve 37 shuts the drain of the signal pressure oil passage, and the B-3 control valve 34 is switched by the application of the signal pressure so that a predetermined apply pressure for matching, which is lowered by the low modulator valve 38, at the engine braking time is fed to the hydraulic servo (B-3) of the brake B3. As a result, the ring gear $R_2$, as retained by the lock of the one-way clutch F2, is further retained in parallel by the brake B3.

Thus, according to the aforementioned mode of embodiment, when the throttle opening is in a region over A % and below B % to effect a manual downshift to the first speed, the lock of the one-way clutch F2 is made prior to applying brake B3 by holding the apply pressure of the brake B3 at a lower level only for the time period (Tdi), as required just before the application, thereby to keep the brake B3 in a standby mode at the low level of apply pressure. If a speed change by the one-way clutch F2 is made for a predetermined time period, the apply pressure is switched after the speed change end to a higher steady level to apply the brake B3. If no speed change is made for the predetermined time period, on the other hand, the speed change by the one-way clutch F2 is impossible. By raising the apply pressure gradually, therefore, it is possible to make a smooth speed change without a shock as might otherwise be caused in the brake B3 by the boosted pressure. In this case, the piston stroke of the brake B3 has already been shortened by the preceding standby under the low pressure. Immediately after a predetermined time period, therefore, the application is started so that the whole speed change time period is not elongated. The aforementioned actions are made when the manual shift mode requiring an especially quick speed change response is demanded, so that a speed change according to the intention of the driver can be made. Thus, a smooth speed change with no shock can be made by the control of locking the one-way clutch in the throttle opening region prior to applying engine braking thus achieving smooth shift control.

According to the structure of the above-described embodiment, when the throttle opening is in the predetermined region and when the vehicle is in the downshift, the lock of the one-way clutch is made prior to applying the engine braking by holding the apply pressure of the engine braking frictional engagement element at a low level immediately before the application for the predetermined time period to make the frictional engagement element standby at the low pressure. If the speed change by the one-way clutch is made for the predetermined time period, the apply pressure is switched to a higher steady level after the end of the speed change to apply the engine braking frictional engagement element. If the speed change does not occur within the predetermined time period, on the other hand, it cannot be made smoothly by the one-way clutch without any biting shock, so the engine braking frictional engagement element is applied smoothly by raising the apply pressure gradually. In this case, the piston stroke of the frictional engagement element has already been shortened by the preceding standby under the low pressure. The application of engine braking pressure to the engine braking frictional engagement elements occurs immediately after the predetermined time period, so that the entire speed change time is not elongated.

According to the structure of the above-described embodiment, it is possible to make the speed change, as intended by the driver, at the manual shift mode selected time demanding an especially quick speed change response.

Furthermore, it is possible to establish a smooth speed change having no shock especially in the slight depression state.

The control of the invention can be made by using the oil pressure control unit which is attached to the automatic transmission.

Although the invention has been described in detail in connection with one embodiment, it can be practiced by modifying the detailed specific structure in various manners within the scope defined by the appended claims.

What is claimed is:

1. A speed change control system for an automatic transmission having a transmission casing comprising:
- a one-way clutch that is locked in a drive state for selectively retaining a rotary element in a stationary position relative to the transmission casing in a speed change mechanism for establishing a predetermined gear stage;
- an engine braking frictional engagement element arranged in parallel with said one-way clutch for selectively retaining said rotary element in a stationary position relative to the transmission casing for establishing said gear stage;
- throttle opening detecting means for detecting a stroke of depression of an accelerator pedal of a vehicle as an indication of throttle opening;
- downshift detecting means for detecting a shift to said predetermined gear stage; and
- apply pressure control means for controlling an apply pressure of said engine braking frictional engagement element,
- wherein said apply pressure control means includes:
  - speed change deciding means for deciding whether a speed change ending decision is made during a predetermined time period, if the throttle opening detected by said throttle opening detecting means is in a predetermined region and if the shift detected by said downshift detecting means is a downshift to said predetermined gear stage; and
  - pressure regulator means for holding the apply pressure of said engine braking frictional engagement element at a low level below a steady level immediately before fully applying said engine braking frictional engagement element after said predetermined time period, and for switching said apply pressure to said steady level, at which said apply pressure is kept, if the speed change ending decision by said speed change deciding means is made, and for raising said apply pressure at a predetermined rate from said low level to said steady level if the speed change ending decision is not made.

2. The speed change control system for an automatic transmission according to claim 1, further comprising a manual shift mode for making it possible to select an arbitrary gear stage manually; and
wherein said downshift detecting means has shift position detecting means for detecting a shift position in the manual shift mode.

3. The speed change control system for an automatic transmission according to claim 1,
wherein said predetermined region is divided into regions for a kickdown control, a slight depression control and a coasting-down control in accordance with the throttle opening, and
wherein said pressure regulator means:
(1) switches the apply pressure of the engine braking frictional engagement element to the steady level at which the apply pressure is kept, if the throttle opening detected by the throttle opening detecting means is in the kickdown control region and if said predetermined gear stage is established by the lock of said one-way clutch so that the speed change ending decision is made by said speed change deciding means;

(2) holds the apply pressure of the engine braking frictional engagement element at said low level for said predetermined time period, if said throttle opening is in the slight depression control region, switches the apply pressure to said steady level higher than said low level, if the speed change ending decision by said speed change deciding means is made during said predetermined time period, and raises the apply pressure at the predetermined rate from said low level if the speed change ending decision is not made; and (3) boosts the apply pressure, then returns the apply pressure to said low level and raises the apply pressure at a predetermined rate if the throttle opening is in the coasting-down control region.

4. A speed change control system for an automatic transmission according to claim 1,
wherein said predetermined region is in the vicinity of a boundary between a drive state and a coasting state.

5. A speed change control system for an automatic transmission according to claim 1,
wherein said pressure regulator means includes: a change-over valve for switching the feed/release of the apply pressure of said engine braking frictional engagement element; a solenoid valve for actuating said change-over valve; and a throttle linear solenoid valve and a low modulator valve for regulating said apply pressure by outputting signal pressures according to the throttle opening.

6. A method of controlling speed change with an automatic transmission, said method comprising the steps of:
(a) detecting a degree of throttle opening;
(b) detecting a downshift to a predetermined gear stage;
(c) setting a predetermined time period;
(d) deciding whether a speed change is ended during said predetermined time period;
(e) deciding whether said degree of throttle opening falls within a predetermined region;
(f) regulating an apply pressure supplied to an engine braking frictional engagement element to a low level below a steady level at which said engine braking frictional engagement element locks a rotating element relative to a transmission casing to establish said predetermined gear stage;
(g) maintaining said apply pressure at said low level for said predetermined time period;
(h) raising said apply pressure immediately from said low level to said steady level if said speed change is ended during said predetermined time period; and
(i) raising said apply pressure at a predetermined rate from said low level to said steady level if said speed change is not ended during said predetermined time period.

7. The method according to claim 6, wherein said predetermined region is divided into a kickdown control region, a slight depression control region and a coasting-down control region in accordance with said degree of throttle opening; said method further comprising the steps of:
(j) regulating said apply pressure to said steady level if said throttle opening falls within said kickdown control region and said speed change is ended during said predetermined time period;
(k) regulating said apply pressure to said low level for said predetermined time period if said throttle opening falls within said slight depression control region, switching said apply pressure immediately from said low level to said steady level if said speed change is ended during said predetermined time period and raising said apply pressure at the predetermined rate from said low level to said steady level if said speed change is not ended during said predetermined time period; and (l) boosting said apply pressure, returning said apply pressure to said low level and raising said apply pressure at a predetermined rate; said throttle opening falls within said coasting-down control region.

* * * * *